United States Patent Office.

GEORGE ALBERT MARINER AND FOLSOM DORSETT, OF CHICAGO, ILLINOIS.

Letters Patent No. 96,936, dated November 16, 1869.

IMPROVED COMPOSITION FOR PREVENTING OXIDATION OF METALLIC WATER OR GAS-PIPES.

The Schedule referred to in these Letters Patent and making part of the same

*To all whom it may concern:*

Be it known that we, GEORGE ALBERT MARINER and FOLSOM DORSETT, both of Chicago, in the county of Cook, and State of Illinois, have invented a new and improved Mode of Preventing the Oxidation of Metallic Water or Gas-Pipes; and we do hereby declare that the following is a full and exact description of the said invention.

The nature of our invention consists in applying, to metallic gas or water-pipes, a covering, composed of a combination of resinous, oleaginous, and mineral substances, and thereby protecting the same from contact with earth, water, air, or other injurious agencies, to which they may be exposed when buried in the soil.

To enable others to use our invention, we will proceed to describe the application of the same.

We melt rosin, or any fusible resinous or bituminous substance, in an iron vessel of suitable form and dimensions; add to the melted mass linseed, fish, or paraffine-oil, or any fixed animal or vegetable oil, or any heavy mineral oil, and then introduce ochre, soapstone, burnt clay, charcoal, and mineral coal, in a dry and pulverized condition. The whole is then thoroughly incorporated by agitation.

The pipes are dipped in the melted mass, and when sufficiently covered, they are removed, and rolled down an inclined bed, covered with pulverized mineral substances, such as sand, or coal-dust, &c., in order to give additional protection, and also greater convenience in handling.

The thickness of the coating may be regulated by increasing or diminishing either the temperature of the bath, or the duration of the immersion.

When the outside alone is to be covered, the ends of the pipes are closed by stoppers. They are dipped by the aid of a crane or derrick.

The following are the ingredients and the proportions which we find to be the most useful:

Rosin, forty-six parts; soapstone, fifteen parts; New Jersey burnt clay, (fire-clay,) twenty parts; ochre, five parts; charcoal, ten parts; paraffine, fish, or linseed-oil, four parts, making one hundred parts.

The proportions of the resinous, oleaginous, and mineral constituents here given may, however, be somewhat varied, without any essential injury to the result.

The great value of our invention consists in the fact, established by practical experience, that it gives perfect protection to gas and water-pipes when buried in the soil, and is therefore adequate to prevent the immense losses caused by the oxidation of the same. It accomplishes this, also, in a useful and practical manner, as the covering applied is economical, indestructible, impervious to air or water, flexible, and rapidly applied, and thus affords an efficient protection from an evil for which no practical remedy, as heretofore, has been found or employed.

What we claim, and desire to secure by Letters Patent of the United States, is—

The within-named composition, compounded as described, and applied to iron pipes, as and for the purposes set forth.

FOLSOM DORSETT.
G. A. MARINER.

Witnesses:
MARK S. WOLCOTT,
GEO. L. PADDOCK.